United States Patent [19]

Joubert

[11] Patent Number: 4,734,214

[45] Date of Patent: Mar. 29, 1988

[54] PROCESS FOR THE PREPARATION OF HIGH ABSORPTIVE SODIUM TRIPOLYPHOSPHATE HEXAHYDRATE

[75] Inventor: Daniel Joubert, Trevoux, France

[73] Assignee: Rhone-Poulenc Chimie de Base, Courbevoie, France

[21] Appl. No.: 22,125

[22] Filed: Mar. 5, 1987

Related U.S. Application Data

[63] Continuation of Ser. No. 741,943, Jun. 6, 1985, abandoned.

[30] Foreign Application Priority Data

Jun. 8, 1984 [FR] France ............................ 84 09002

[51] Int. Cl.$^4$ ...................... C01B 25/41; C11D 3/075; C11D 7/16; C11D 11/02
[52] U.S. Cl. ...................................... 252/135; 252/91; 252/174; 423/315; 427/215
[58] Field of Search .................. 423/315; 252/135, 91, 252/174; 427/215

[56] References Cited

U.S. PATENT DOCUMENTS

| | | | |
|---|---|---|---|
| 2,961,410 | 11/1960 | Martin | 252/135 |
| 3,054,656 | 9/1962 | Cassidy | 423/315 |
| 3,394,986 | 7/1968 | Shen | 423/315 |
| 3,574,121 | 4/1971 | Merkenich | 252/135 |
| 3,639,287 | 2/1972 | Gabler | 252/135 |
| 3,672,826 | 6/1972 | Hornig | 423/315 |
| 4,310,431 | 1/1982 | Joshi | 252/91 |
| 4,328,114 | 5/1982 | Johnson | 252/135 |
| 4,362,641 | 12/1982 | Peterson | 252/135 |
| 4,454,054 | 6/1984 | Landgräber | 252/135 |

*Primary Examiner*—Dennis Albrecht
*Attorney, Agent, or Firm*—Burns, Doane, Swecker & Mathis

[57] ABSTRACT

Solid, free-flowing, essentially nonfriable powdery detergent particulates of recrystallized sodium tripolyphosphate hexahydrate having high absorption capacity and a pore volume of at least 0.70 cm$^3$/g, at lest 80% of the intercrystalline porosity thereof comprising pore sizes ranging from 0.5 μm to 30 μm, are prepared by (i) spraying water or an aqueous medium over a first fraction of anhydrous sodium tripolyphosphate, the majority of which fraction comprises phase 1 tripolyphosphate, (ii) spraying water or an aqueous medium over a separate second fraction of anhydrous sodium tripolyphosphate, which second fraction essentially consists of phase 2 triplyphosphate, (iii) intimately admixing said first and said second sprayed fractions, (iv) suspending the resulting admixture in water or an aqueous medium, and then (v) drying the resulting suspension, e.g., by atomization.

6 Claims, No Drawings

PROCESS FOR THE PREPARATION OF HIGH ABSORPTIVE SODIUM TRIPOLYPHOSPHATE HEXAHYDRATE

This application is a continuation of application Ser. No. 741,943, filed June 6, 1985, now abandoned.

BACKGROUND OF THE INVENTION

1. Field of the Invention

The present invention relates to an improved hexahydrated sodium tripolyphosphate having high absorption capacity, especially adopted for detergent composition applications, and to a process for the preparation thereof.

2. Description of the Prior Art

The preparation of a hexahydrated sodium tripolyphosphate (TPP) is well known to this art.

According thereto, the sodium TPP, in an anhydrous or essentially anhydrous state, is introduced into water under agitation and recrystallization is permitted to occur via the following diagrammatic mechanism:

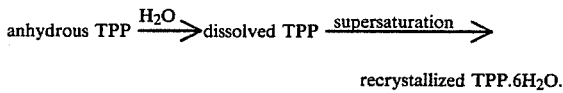

When it is considered that the exothermic TPP hydration reaction is complete, a drying operation is next carried out, typically by atomization, thus providing a light granular powder having a specific gravity of less than 1, usually ranging from 0.3 to 0.8.

However, the materials produced using the aforenoted known procedure suffer from defects or inadequacies with regard to the quality thereof sought to be attained. In particular, such materials suffer from low levels of capacity for absorption or retention of liquid ingredients. Now, absorption capacity is an essential quality in detergency, as it permits the incorporation, to a greater or lesser extent, of additives which are required for detergent formulations, for example, non-ionic surface active agents. Moreover, the solidity or resistance to attrition of the individual granular particulates may also be unsatisfactory.

SUMMARY OF THE INVENTION

Accordingly, a major object of the present invention is the provision of an improved hexahydrated sodium TPP having a capacity for an unexpectedly high level of fluid absorption, as well as having good grain solidity.

The present invention also features a process for the preparation of such improved hexahydrated sodium tripolyphosphate, comprising:

(i) spraying water or an aqueous medium over a first fraction of anhydrous sodium tripolyphosphate, the majority of which is present in the form of phase 1 Na TPP;

(ii) separately spraying water or an aqueous medium over a second fraction of anhydrous sodium tripolyphosphate, which second fraction essentially consists of phase 2 Na TPP;

(iii) intimately admixing said first and said second sprayed fractions;

(iv) suspending the resulting admixture in water or an aqueous medium; and thence (v) drying the resulting suspension to produce hexahydrated sodium tripolyphosphate.

DETAILED DESCRIPTION OF THE INVENTION

More particularly according to the present invention, the improved Na TPP.6H$_2$O produced consistent herewith is characterized in that it has a pore volume of at least 0.70 cm$^3$/g and the major amount of its intercrystalline porosity, namely, at least 80%, evidences pore sizes ranging from 0.5 μm to 30 μm.

Such improved tripolyphosphate is particularly advantageous, having regard to the fact that it is the pores which are of the aforesaid sizes that are especially well suited for the absorption of non-ionic surface active agents in detergent compositions/formulations.

In accordance with one embodiment of the invention, a suspension of tripolyphosphate in water is sprayed over the aforesaid anhydrous tripolyphosphates.

In a preferred embodiment of the invention, a suspension of the same TPP in water is sprayed over each of the TPP fractions.

As above-indicated, the starting point for the process according to the invention is the two specific anhydrous TPP fractions.

As regards the first TPP, its essential characteristic is that a majority thereof is in the form of phase 1 TPP. More precisely, it is preferable for that TPP to comprise at least 55% of phase 1 TPP and more particularly from 60 to 100% of phase 1 TPP. Generally, it is preferred to use a TPP which has the maximum possible content of phase 1 TPP as the first fraction of TPP.

The preparation of such TPP is not an object of this invention. The preparation may be carried out using any suitable known procedure. For example, polycondensation of the TPP may be carried out in a rotary furnace. Finally, it will be noted that the level of purity of the first fraction of TPP is not a critical factor, by which is intended the proportion of metallic impurities, in particular alkaline earths such as calcium and magnesium.

As regards the second fraction of anhydrous TPP, that must essentially consist of phase 2 TPP. It is preferable for the second TPP fraction to contain not more than 10% of phase 1 TPP. Broadly speaking, it is advantageous to use a TPP which has the maximum possible content of phase 2 TPP as the second fraction of TPP.

The second TPP may also be prepared using any suitable method, known to this art.

In contrast, it is preferable for the second fraction of TPP to be purified in respect of metallic impurities such as calcium and magnesium.

Thus, the best results will be obtained using TPP fractions which are prepared from liquors which, before polycondensation, have a total content of Ca and Mg of less than 100 ppm. TPP fractions prepared in this manner have a total content of those elements of 80 ppm. Such a liquor may be produced, for example, by liquid/liquid extraction using known techniques.

The two TPP fractions noted above, after optional cooling and crushing, are then seeded or conditioned by spraying water or an aqueous medium thereon.

The focus of the spraying operation is to cause seeds of hexahydrates to appear in the product which remains in an essentially anhydrous condition, which seeds will promote recrystallization, increase the kinetics thereof and in particular prevent the formation of specks or nodules which are poorly crystallized or incompletely hydrated, being especially problematical in all processes for the formulation of detergents using suspensions or slurries.

The seeding operation may be effected by spraying water, for example, from 0.1 to 3% of water with respect to the anhydrous TPP. In that case, the hexahydrate seeds appear after a certain maturing or aging period.

However, in a preferred embodiment of the invention, the seeding operation is carried out by spraying an aqueous suspension of TPP.

That suspension may be prepared in the following manner, for example. A sufficient amount of TPP to be in a state of supersaturation is added to water, in particular permuted water. The amount of TPP used is generally at least 18% and is such as to produce a homogenous, pumpable suspension. Preferably, the prepared suspension contains from 30 to 35% of TPP. The suspension is maintained at from 60° C. to 80° C. and agitated for at least 10 minutes.

The spraying operation is carried out using any known means. Generally, the amount of suspension sprayed is from 0.2 to 3% by weight with respect to the anhydrous TPP.

Generally, and preferably, the invention provides for spraying over the first TPP fraction a suspension of the same TPP, and over the second fraction, a suspension of the same second TPP.

On an industrial scale, and in the preferred embodiment referred to earlier, the TPP which is "seeded" after spraying may be partly recycled and returned to the tank for preparing the suspension. This facilitates hydration of the TPP and, therefore, preparation of the suspension.

The advantage of spraying a suspension is that the hexahydrate seeds are preformed in the suspension. They will, therefore, be immediately present in the anhydrous TPP in a very fine form which is particularly suitable without any necessity for a maturing or aging operation. The TPP fractions when treated in such fashion will occur in the form of a powder. Such fractions are then intimately mixed. The proportions of the two TPP fractions are selected that the overall proportion of phase 1 TPP in the mixture is at least 40%. Generally, the overall proportion of phase 1 TPP will vary from 40% to 60%.

The mixture of TPP produced is then put into suspension or slurry form by addition to water. The slurry is dried, typically by atomization, providing a hexahydrated product in powdery and granular form. The operation of forming the suspension and the atomization operation are carried out using any known technique. In particular, the suspension is prepared at a temperature (at the moment of introduction of the TPP) which preferably ranges from 50° to 80° C. The procedure is carried out under conditions, in particular in respect of temperature, such as to give total hydration and recrystallization of the two TPP fractions. The drying operation must be carried out in such manner as to prevent dehydration of the hexahydrate; thus, the maximum temperature in the case of the atomization operation in particular (the temperature of the product at the outlet of the atomization tower) should not exceed 105° C.

Finally, it is possible to add to the suspension produced from the mixture of the two TPP fractions, any suitable additive, either for affecting the recrystallization of the TPP.6H$_2$O or the proportion of recrystallized TPP.6H$_2$O with respect to the TPP which remains dissolved, or to enhance the solidity of the grains produced.

In the former situation, and for recrystallization of the TPP, particular surface active agents are involved, more particularly non-ionic surface active agents which, when used in small amounts, influence the speed of recrystallization of the TPP.6H$_2$O, and also the size of the crystals. Additions of soluble ethoxylated non-ionic surface active agents, in amounts which are less than 1% by weight with respect to the entire mass of the suspension, promote the production of a high-quality atomizate.

In another respect, additives having alcohol, non-hydric alcohol or polyol functions are used which influence the TPP.6H$_2$O/dissolved TPP proportion by increasing it, the effect thereof being to further increase the porosity attained, drying of the dissolved fraction logically resulting in certain pores being blocked off, but also resulting in consolidation of the aggregates formed.

Amounts of alcohols, for example, ethanol, methanol, isopropanol and butanol, of from 0.1 to 5% with respect to the entirety of the suspension, are favorable, after drying, for the production of a high level of porosity.

In the second situation, as regards the additives which are capable of improving the resistance to attrition of the formed grains, the procedure essentially entails using organic or inorganic film-forming substances, such as sodium disilicate in a pre-dissolved state, organic film-forming polymers or binders such as starch, gelatin, polyvinyl alcohol and carboxymethylcellulose.

The amounts of the various advantageous additives may vary, but they must be limited in order to ensure that, after drying, the potential porosity offered by the crystalline arrangements produced in the suspension is not blocked.

In order to further illustrate the present invention and the advantages thereof, the following specific examples are given, it being understood that same are intended only as illustrative and in nowise limitative.

EXAMPLE 1

This example illustrates the process of the invention, using two TPP fractions having the following characteristics:

TPP1:

This TPP contained 65% of phase 1 TPP and had a weight loss at 550° C. of 0.3%, a granulometry which was characterized by a level of rejection on a 315$\mu$ sieve of less than 10%, a mean diameter of about 100$\mu$, a proportion of "true" TPP of 92.5% and a content of impurities Ca$^{++}$ of 300 ppm and Mg of 250 ppm. It was seeded with 3% of a suspension formed by 35% of the same TPP which was dispersed and agitated for 10 minutes at 65° C. in water. The seeding operation was carried out by spraying that suspension over the TPP.

TPP2:

This TPP contained 92% of phase 2 TPP. It had a weight loss at 550° C. of 0.6%, a granulometry which was characterized by a level of rejection on a 315$\mu$ sieve of 20% maximum, a mean diameter of 120$\mu$, a TPP content of 96.5% and a calcium content of 40 ppm and a magnesium content of 20 ppm. It was seeded with 2% of a suspension formed by 25 g of the same TPP in 75 g of water which was raised to 60° C. and agitated for 15 minutes.

1 kg of each of the foregoing components was mixed for 5 minutes, using a "Lodige M5G" laboratory apparatus.

The admixture according to the invention was used in an atomization slurry employing the following technique, then dried by means of a BUCHI type laboratory atomizer dryer.

(1) Tapwater, hardness of 30°th, 60° C.: 1 kg
(2) TPP, mixture according to the invention: 950 g
(3) Agitation at 200 rpm: 12 minutes
(4) Temperature upon completion of agitation: 78° C.

After drying, a product was obtained containing 18.5% of water (measured by weight loss at 550° C.), which evidenced that the major portion of the product obtained was sodium tripolyphosphate in hexahydrate state, and which was also in powder and granular form. The absorption capability of that substance, as measured by means of a test using a liquid non-ionic surface active agent, "Cemulsol DB 311", was 38.5 g of liquid for 100 g of hexahydrated TPP. The mixture produced was a non-sticky substance which flowed freely, which evidenced that absorption was proper and that the absorption limit had not been exceeded.

The pore distribution as measured by a mercury porosimeter operating under pressure, in the TPP produced in accordance with this example, was as follows:

| Pore size | Percentage of the total pore volume |
|---|---|
| >30 μm | 8% |
| 10 μm–30 μm | 26% |
| 1 μm–10 μm | 33% |
| 0.5 μm–1 μm | 21% |
| <0.5 μm | 12% |
| Total pore volume | 0.76 cm³/g |

Comparative examples now follow:

EXAMPLE 2

This example features the preparation, under the same conditions, of a suspension of TPP which was then dried, but the mixture according to the invention was replaced by TPP1, which was the only fraction seeded.

The product after drying displayed a weight loss at 550° C. of 19.8%.

However, it was much more friable than the product obtained in Example 1.

Its capacity for absorption in respect of the liquid non-ionic surface active agent was 24 g for 100 g of hexahydrated TPP.

EXAMPLE 3

Again using similar conditions, seeded TPP2 was used.

Unlike the previous examples, for forming the slurry, the period of agitation was 18 minutes and the temperature upon completion of the reaction was 72° C.

After drying, the product displayed a weight loss at 550° C. of 17.1%, and the TPP, therefore, remained primarily in hexahydrated form, but a not inconsiderable fraction had been dehydrated during the drying operation.

The absorption capability was now only 18 g of liquid for 100 g of powder, and the product was extremely friable.

EXAMPLE 4

In this example a novel tripolyphosphate was used, having a proportion of phase 1 TPP of about 35%, but produced in a single polycondensation operation and not by mixing. The product was seeded by spraying 2% of water, maturing for 24 hours and recrushing to give a mean diameter of about 100μ.

It was noted that the amount of phase 1 TPP was identical to that of the mixture according to the invention, as described and used in Example 1.

After drying, the product obtained contained 18.2% of water.

Its absorption capability was 22 g of liquid for 100 g of powder.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of sodium tripolyphosphate hexahydrate having high adsorption characteristics and having a pore volume of at least 0.70 cm³/gram comprising the following steps:
   (i) spraying water or an aqueous medium over a first fraction of anhydrous sodium tripolyphosphate wherein at least 55% of the first fraction of anhydrous sodium tripolyphosphate is comprised of phase 1 tripolyphosphate;
   (ii) separately spraying water on aqueous medium over a second fraction of anhydrous sodium tripolyphosphate wherein the second fraction of anhydrous sodium tripolyphosphate consists essentially of phase 2 tripolyphosphate, and said second fraction contains not more than 10% of phase 1 tripolyphosphate and has been purified of calcium and magnesium values, and wherein the spraying operations of steps (i) and (ii) create seeds of hexahydrates so that the first and second fractions remains in essentially anhydrous form and the seeds are sufficient to promote the formation of hexahydrates of sodium tripolyphosphate, wherein such seeds are formed with water sprayed in a percentage of from 0.1 to 3% by weight based on the anhydrous sodium tripolyphosphate or with a suspension of sodium tripolyphosphate, as said aqueous medium, sprayed in a percentage of from 0.2 to 3% by weight relative to anhydrous sodium tripolyphosphate,
   (iii) intimately admixing said first and said second sprayed fractions, said intimate admixture comprising from 40 to 60% of phase 1 tripolyphosphate;
   (iv) suspending the resulting admixture in water or an aqueous medium, and thence;
   (v) drying the resulting suspension by atomization to produce hexahydrated sodium tripolyphosphate.

2. The process as defined by claim 1, said first tripolylphosphate fraction comprising from 60 to 100% of phase 1 tripolyphosphate.

3. The process as defined by claim 1, wherein said steps (i) and (ii) a suspension of tripolyphosphate in water is sprayed over said anhydrous tripolyphosphate fractions.

4. The process as defined by claim 3, wherein each spraying suspension comprises the same tripolyphosphate as the respective fractions sprayed.

5. The process as defined by claim 3, wherein the spraying suspension contains at least 18% of the tripolyphosphate.

6. The process as defined by claim 3, wherein the spraying suspension contains from 30 to 35% of the tripolyphosphate.

* * * * *